(12) United States Patent
Medarametla Lakshmi (10) Patent No.: US 12,348,301 B2
(45) Date of Patent: Jul. 1, 2025

(54) DYNAMIC POWER CONFIGURATION OF LOW EARTH ORBIT SATELLITES

(71) Applicant: T-MOBILE INNOVATIONS LLC, Overland Park, KS (US)

(72) Inventor: Bharath Reddy Medarametla Lakshmi, Issaquah, WA (US)

(73) Assignee: T-Moble Innovations LLC, Overland Park, KS (US)

( * ) Notice: Subject to any disclaimer, the term of this patent is extended or adjusted under 35 U.S.C. 154(b) by 397 days.

(21) Appl. No.: 18/078,860

(22) Filed: Dec. 9, 2022

(65) Prior Publication Data
US 2024/0195493 A1    Jun. 13, 2024

(51) Int. Cl.
*H04B 7/185* (2006.01)
*H04B 7/195* (2006.01)
*H04B 17/318* (2015.01)

(52) U.S. Cl.
CPC ......... *H04B 7/18543* (2013.01); *H04B 7/195* (2013.01); *H04B 17/318* (2015.01)

(58) Field of Classification Search
CPC .. H04B 7/18543; H04B 7/195; H04B 17/318; H04B 7/18513
USPC ........................................................ 371/318
See application file for complete search history.

(56) References Cited

U.S. PATENT DOCUMENTS

| | | |
|---|---|---|
| 2011/0189948 A1 | 8/2011 | Miller |
| 2016/0204865 A1* | 7/2016 | Boroson ................ H04B 10/40 398/97 |
| 2016/0371985 A1* | 12/2016 | Kotecha .................. G08G 5/26 |
| 2021/0320713 A1* | 10/2021 | Perlow ................ H04B 7/0617 |
| 2022/0052753 A1* | 2/2022 | Speidel ................ H04B 7/18513 |
| 2023/0370862 A1* | 11/2023 | Rajan .................. H04W 52/285 |
| 2024/0056171 A1 | 2/2024 | Shariatmadari et al. |
| 2024/0244445 A1* | 7/2024 | Furuichi ............... H04W 16/14 |
| 2024/0267853 A1* | 8/2024 | Yin ...................... H04W 52/283 |
| 2024/0276238 A1* | 8/2024 | Ashari ................ H04B 7/0691 |

FOREIGN PATENT DOCUMENTS

| | | |
|---|---|---|
| EP | 2451088 A2 | 5/2012 |
| EP | 4016871 A1 | 6/2022 |

OTHER PUBLICATIONS

European Search Report received for Patent Application No. 23215515.0, mailed on Jun. 3, 2024, 7 pages.

* cited by examiner

*Primary Examiner* — Hashim S Bhatti
*Assistant Examiner* — Oladiran Gideon Olaleye
(74) *Attorney, Agent, or Firm* — SHOOK, HARDY & BACON L.L.P.

(57) ABSTRACT

According to aspects herein, methods and a non-transitory computer storage medium storing computer instructions for dynamic power configuration of LEO satellites are provided. The method begins with receiving, at an extraterrestrial base station, at least one first uplink communication from a first device. The first uplink communication contains an altitude measurement and at least one of: a signal strength measurement and a power level of the first device. The method then continues with determining a location and transmission angle of the first device with respect to a field of regard of the extraterrestrial base station. Then, a downlink transmission power setting for the extraterrestrial base station is dynamically determined based on the altitude measurement and the transmission angle of the first device.

20 Claims, 4 Drawing Sheets

DYNAMIC POWER CONFIGURATION OF LOW EARTH ORBIT SATELLITES

BACKGROUND

Low earth orbit (LEO) satellites are increasingly used for new customer applications, especially for customers that require coverage in remote areas or who require global access. LEOs may provide internet and other data services. As users rely on mobile devices, known as user equipment (UE), the use cases for UEs has grown considerably. One such use case is to provide cellular service using LEO constellations of satellites. Providing services to users who may be well beyond typical cellular network coverage poses a challenge as those users may be at highly variable elevations in equally variable weather conditions. Both elevation and weather conditions may adversely affect downlink power to the user. Deploying additional LEOs to a constellation is time-consuming and expensive. LEOs have limited downlink power capability and need to provide downlink power to all users without transmitting to all users at higher than necessary downlink transmit power levels.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods for dynamic power configuration of LEO satellites is provided. The method begins with receiving, at an extraterrestrial base station, at least one first uplink communication from a first device. The first uplink communication contains an altitude measurement of the first device and at least one of: a signal strength measurement and a power level of the first device. The method then continues with determining a location and transmission angle of the first device with respect to a field of regard of the extraterrestrial base station. Then, a downlink transmission power setting for the extraterrestrial base station is dynamically determined based on the altitude measurement and the transmission angle of the first device.

In a further embodiment, a method of dynamic power configuration of low earth orbit satellites in a network is provided. The method begins with transmitting, from a first device, at least one first uplink communication, the first uplink communication containing an altitude measurement of the first device and at least one of: a signal strength measurement and a power level of the first device. The method then continues with dynamically adjusting an uplink transmission power setting for the device in response to receiving a downlink communication, the downlink communication based on the altitude measurement and the transmission angle of the first device.

An additional embodiment provides a non-transitory computer storage media storing computer-useable instructions that, when executed by one or more processors cause the processors to receive, at an extraterrestrial base station, at least one first uplink communication from a first device, the first uplink communication containing an altitude measurement of the first device and at least one of: a signal strength measurement and a power level of the first device. The instructions then continue with determine a location and a transmission angle of the first device with respect to a field of regard of the extraterrestrial base station. The instructions then conclude with dynamically determine a downlink transmission power setting for the extraterrestrial base station based on the altitude measurement and the transmission angle of the first device.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the term "base station" refers to a centralized component or system of components that is configured to wirelessly communicate (receive and/or transmit signals) with a plurality of stations (i.e., wireless communication devices, also referred to herein as user equipment (UE(s))) in a particular geographic area. As used herein, an extraterrestrial base station is distinguished from a terrestrial base station on the basis of its lack of ground coupling; some examples of extraterrestrial base stations include airborne (e.g., on an aircraft or airship) and satellites (e.g., low earth orbit (LEO), medium earth orbit (MEO), and geostationary orbit (GEO)). As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 6G, 802.11x, and the like.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
6G Sixth-Generation Cellular Communication System
AI Artificial Intelligence
CD-ROM Compact Disk Read Only Memory
CDMA Code Division Multiple Access
eNodeB Evolved Node B
GEO Geostationary orbit
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LEO Low earth orbit satellite
LTE Long Term Evolution
MEO Medium earth orbit
MIMO Multiple Input Multiple Output
MD Mobile Device
ML Machine Learning
PC Personal Computer
PCS Personal Communications Service
PDA Personal Digital Assistant
PDSCH Physical Downlink Shared Channel
PHICH Physical Hybrid ARQ Indicator Channel
PUCCH Physical Uplink Control Channel
PUSCH Physical Uplink Shared Channel
QPSK Quadrature Phase Shift Keying
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., nodes, cell sites, cell towers) to provide network coverage. The base stations are employed to broadcast and transmit transmissions to user devices of the telecommunications network. An base station may be considered to be a portion of a base station that may comprise an antenna, a radio, and/or a controller. In aspects, a base station is defined by its ability to communicate with a user equipment (UE), such as a wireless communication device (WCD), according to a single protocol (e.g., 3G, 4G, LTE, 5G, or 6G, and the like); however, in other aspects, a single base station may communicate with a UE according to multiple protocols. As used herein, a base station may comprise one base station or more than one base station. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

The provision of telecommunication services moved beyond the earth's surface decades ago with geostationary satellites providing trunk and backhaul services for the service providers. Today we are now seeing individual user's directly experience communications moving beyond the earth's surface. While network operators provided service only through terrestrial base stations, with satellite communications operators will begin to operate extraterrestrial base stations, either on their own or in partnership with third parties. Terrestrial base stations provide service to mobile users from fixed locations. The challenge increases when both the UE and the extraterrestrial base station are moving. Users not only move horizontally, they may move vertically as well, moving to locations high above sea level, as well as into remote areas well away from any terrestrial base stations. The downlink signal power from the LEO satellite may require adjustments to signal strength to cover the users operating through the extraterrestrial base station. Downlink signal power may be decreased if a user gains altitude or signal power increase through the movement of the satellite through the sky, or increased if a user encounters weather conditions that may attenuate the signal. These situations may occur separately or together.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station may be extraterrestrial. The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 100 described herein with respect to FIG. 1.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station.

In aspects, a UE provides UE data including location and channel quality information to the wireless communication network via the base station. Location information may be based on a current or last known position utilizing GPS or other satellite location services, terrestrial triangulation, an base station's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the base station or at the individual antenna array of the base station. In other aspects, the processing of said information may be done remotely.

A service state of the UEs may include, for example, an in-service state when a UE is in-network (i.e., using services of a primary provider to which the UE is subscribed to, otherwise referred to as a home network carrier), or when the UE is roaming (i.e., using services of a secondary provider providing coverage to the particular geographic location of the UE that has agreements in place with the primary provider of the UE). The service state of the UE may also include, for example, an emergency only state when the UE is out-of-network and there are no agreements in place between the primary provider of the UE and the secondary provider providing coverage to the current geographic location of the UE. Finally, the service state of the UE may also include, for example, an out of service state when there are no service providers at the particular geographic location of the UE.

The UE data may be collected at predetermined time intervals measured in milliseconds, seconds, minutes, hours, or days. Alternatively, the UE data may be collected continuously. The UE data may be stored at a storage device of the UE, and may be retrievable by the UE's primary provider as needed and/or the UE data may be stored in a cloud based storage database and may be retrievable by the UE's primary provider as needed. When the UE data is stored in the cloud based storage database, the data may be stored in association with a data identifier mapping the UE data back to the UE, or alternatively, the UE data may be collected without an identifier for anonymity.

In accordance with a first aspect of the present disclosure a method of dynamic power configuration of LEO satellites is provided. The method begins with receiving, at an extraterrestrial base station, at least one first uplink communication from a first device. The first uplink communication contains and altitude measurement and at least one of: an altitude of the first device and a signal strength measurement and a power level of the first device. The method then continues with determining a location and transmission angle of the first device with respect to a field of regard of the extraterrestrial base station. Then, a downlink transmission power setting for the extraterrestrial base station is dynamically determined based on the altitude measurement and the transmission angle of the first device.

A second aspect of the present disclosure provides a method of dynamic power configuration of low earth orbit satellites in a network. The method begins with transmitting, from a first device, at least one first uplink communication, the first uplink communication containing an altitude measurement of the first device and at least one of: a signal strength measurement and a power level of the first device. The method then continues with dynamically adjusting an uplink transmission power setting for the device in response to receiving a downlink communication, the downlink communication based on the altitude measurement and the transmission angle of the first device.

Another aspect of the present disclosure is directed to a non-transitory computer storage media storing computer-useable instructions that, when executed by one or more processors cause the processors to receive, at an extraterrestrial base station, at least one first uplink communication from a first device, the first uplink communication containing an altitude measurement of the first device and at least one of: a signal strength measurement and a power level of the first device. The instructions then continue with determine a location and a transmission angle of the first device with respect to a field of regard of the extraterrestrial base station. The instructions then conclude with dynamically determine a downlink transmission power setting for the extraterrestrial base station based on the altitude measurement and the transmission angle of the first device.

Figure 1:
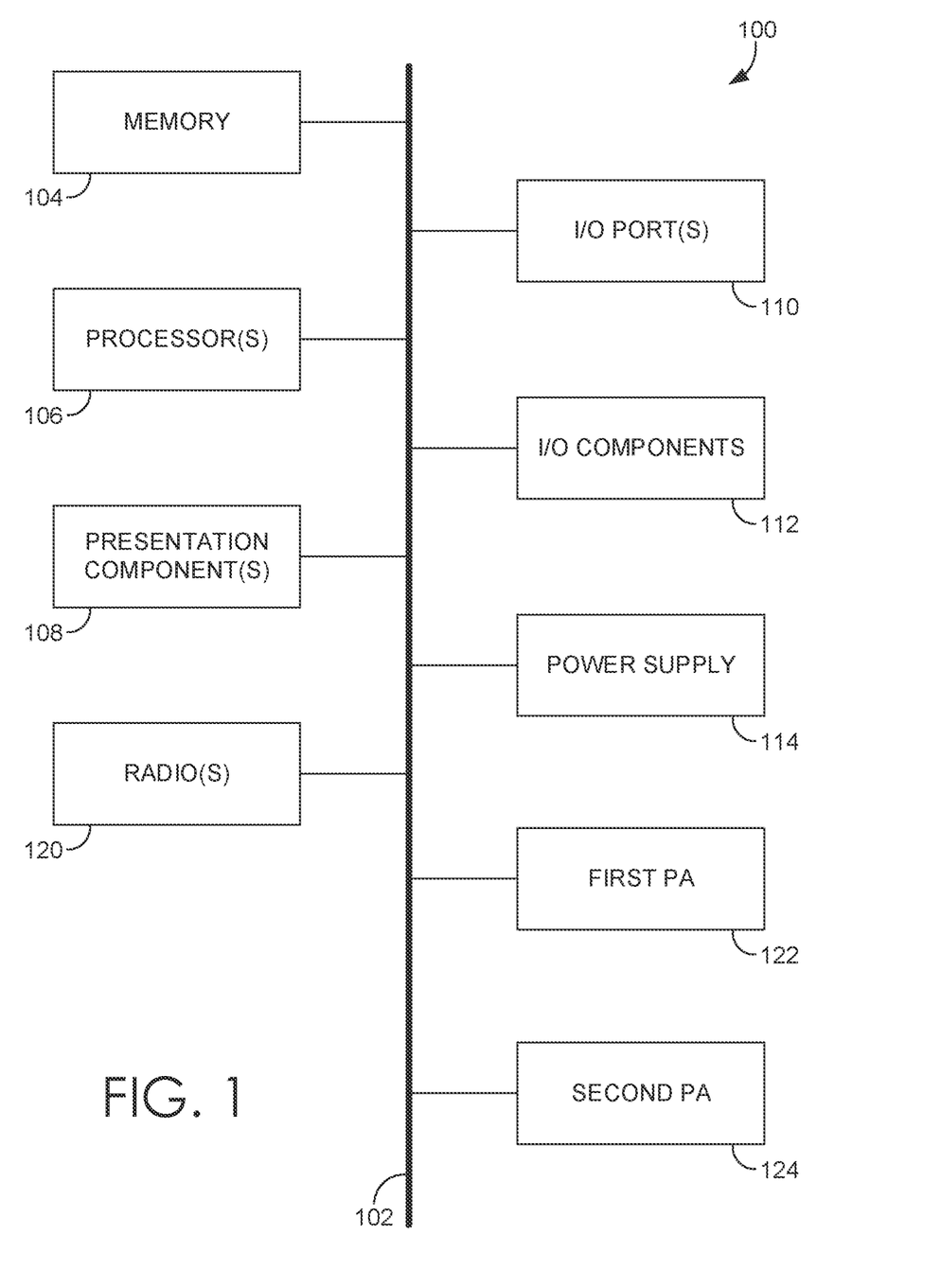
FIG. 1 illustrates an exemplary computing device in which implementations of the present disclosure may be employed, in accordance with aspects herein.

FIG. 1 illustrates an exemplary computing device in which implementations of the present disclosure may be employed, in accordance with aspects herein. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment, wireless communication device, or user device, The computing device 100 may take many forms; non-limiting examples of the computing device 100 include a fixed wireless access device, cell phone, tablet, internet of things (IOT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100.

Illustrative I/O components 112 include a microphone, joystick, game pad, satellite dish, scanner, printer, wireless device, etc.

A first radio 120 and second radio 130 represent radios that facilitate communication with one or more wireless networks using one or more wireless links. In aspects, the first radio 120 utilizes a first transmitter 122 to communicate with a wireless network on a first wireless link and the second radio 130 utilizes the second transmitter 132 to communicate on a second wireless link. Though two radios are shown, it is expressly conceived that a computing device with a single radio (i.e., the first radio 120 or the second radio 130) could facilitate communication over one or more wireless links with one or more wireless networks via both the first transmitter 122 and the second transmitter 132. Illustrative wireless telecommunications technologies include CDMA, GPRS, TDMA, GSM, and the like. One or both of the first radio 120 and the second radio 130 may carry wireless communication functions or operations using any number of desirable wireless communication protocols, including 802.11 (Wi-Fi), WiMAX, LTE, 3G, 4G, LTE, 5G, NR, VOLTE, or other VoIP communications. In aspects, the first radio 120 and the second radio 130 may be configured to communicate using the same protocol but in other aspects they may be configured to communicate using different protocols. In some embodiments, including those that both radios or both wireless links are configured for communicating using the same protocol, the first radio 120 and the second radio 130 may be configured to communicate on distinct frequencies or frequency bands (e.g., as part of a carrier aggregation scheme). As can be appreciated, in various embodiments, each of the first radio 120 and the second radio 130 can be configured to support multiple technologies and/or multiple frequencies; for example, the first radio 120 may be configured to communicate with a base station according to a cellular communication protocol (e.g., 4G, 5G, 6G, or the like), and the second radio 130 may configured to communicate with one or more other computing devices according to a local area communication protocol (e.g., IEEE 802.11 series, Bluetooth, NFC, z-wave, or the like).

Figure 2:
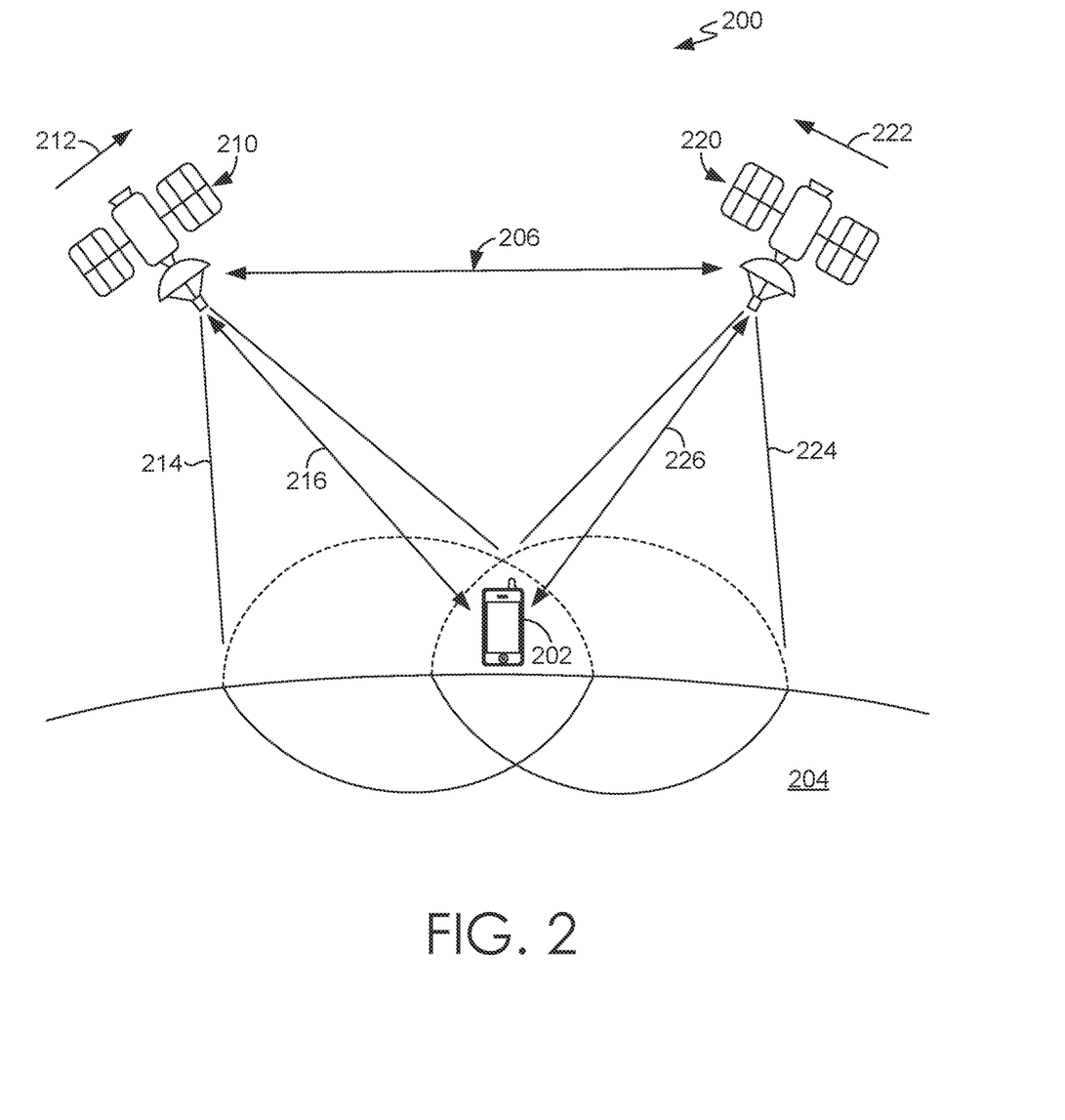
FIG. 2 depicts a diagram of an exemplary environment suitable for use in implementations of the present disclosure, in accordance with aspects herein.

FIG. 2 depicts a diagram of an exemplary environment suitable for use in implementations of the present disclosure, in accordance with aspects herein. Such a network environment is illustrated and designated generally as network environment 200. At a high level the network environment 200 comprises a UE 202 that is at an altitude on the earth 204, and two or more extraterrestrial base stations, represented in FIG. 2 as a first extraterrestrial base station 210 and a second extraterrestrial base station 220. The altitude of UE 202 may vary and the UE 202 may encounter weather conditions that may attenuate a signal received from either first extraterrestrial base station 210 or second extraterrestrial base station 220. The UE 202 may communicate through either first extraterrestrial base station 210 or second extraterrestrial base station 220. Though each of the first extraterrestrial base station 210 and the second extraterrestrial base station 220 are illustrated as being satellites, it should be understood that the present disclosure is not limited to space-based implementations; either or both of the first extraterrestrial base station 210 and the second extraterrestrial base station 220 may be in the form of an aircraft or any other non-terrestrial base station. Similarly, though the UE 202 is illustrated as a cellular phone, the UE 202 may be any computing device described with respect to FIG. 1.

Each of the first extraterrestrial base station 210 and the second extraterrestrial base station 220 are configured to wirelessly communicate with the UE 202. In aspects, each of the extraterrestrial base stations may communicate with the UE using any wireless telecommunication protocol desired by a network operator, including but not limited to 3G, 4G, 5G, 6G, 802.11x and the like. Each of the first extraterrestrial base station 210 and the second extraterrestrial base station 220 may establish a wireless connection with the UE 202; the first extraterrestrial base station 210 may communicate with the UE 202 using a first wireless link 216 and the second extraterrestrial base station 220 may communicate with the UE 202 using a second wireless link 226. Though illustrated as a two-way communication link, either or both of the first wireless link 216 and the second wireless link 226 may be one-way (i.e., downlink only) instead of bi-directional (i.e., downlink and uplink). Each of the first extraterrestrial base station 210 and the extraterrestrial base station may be said to provide telecommunication coverage to a geographic area; as illustrated in FIG. 2, the first extraterrestrial base station 210 may be said to serve a first geographic coverage area 214 and the second extraterrestrial base station 220 may be said to serve a second geographic coverage area 224. Further, FIG. 2 illustrates that each of the first extraterrestrial base station 210 and the second extraterrestrial base station 220 are in motion relative to the UE 202; that is, the first extraterrestrial base station 210 may be said to moving along a first track 212 and the second extraterrestrial base station 220 may be said to be moving along a second track 222. Despite the illustrated embodiment, in some aspects of the present disclosure, either or both of the first extraterrestrial base station 210 and the second extraterrestrial base station 220 may be stationary with respect to a point on the earth 204 (i.e., the extraterrestrial base station may be in a GEO orbit). In addition to the connection between the extraterrestrial base stations and the UE 202, in some aspects of the present disclosure, the first extraterrestrial base station 210 may be communicatively coupled, via a direct connection link 206, to the second extraterrestrial base station 220; in other aspects, the first extraterrestrial base station 210 may be communicatively coupled to the second extraterrestrial base station 220 via one or more ground stations (not illustrated so as not to obscure other portions of the invention).

Figure 3:
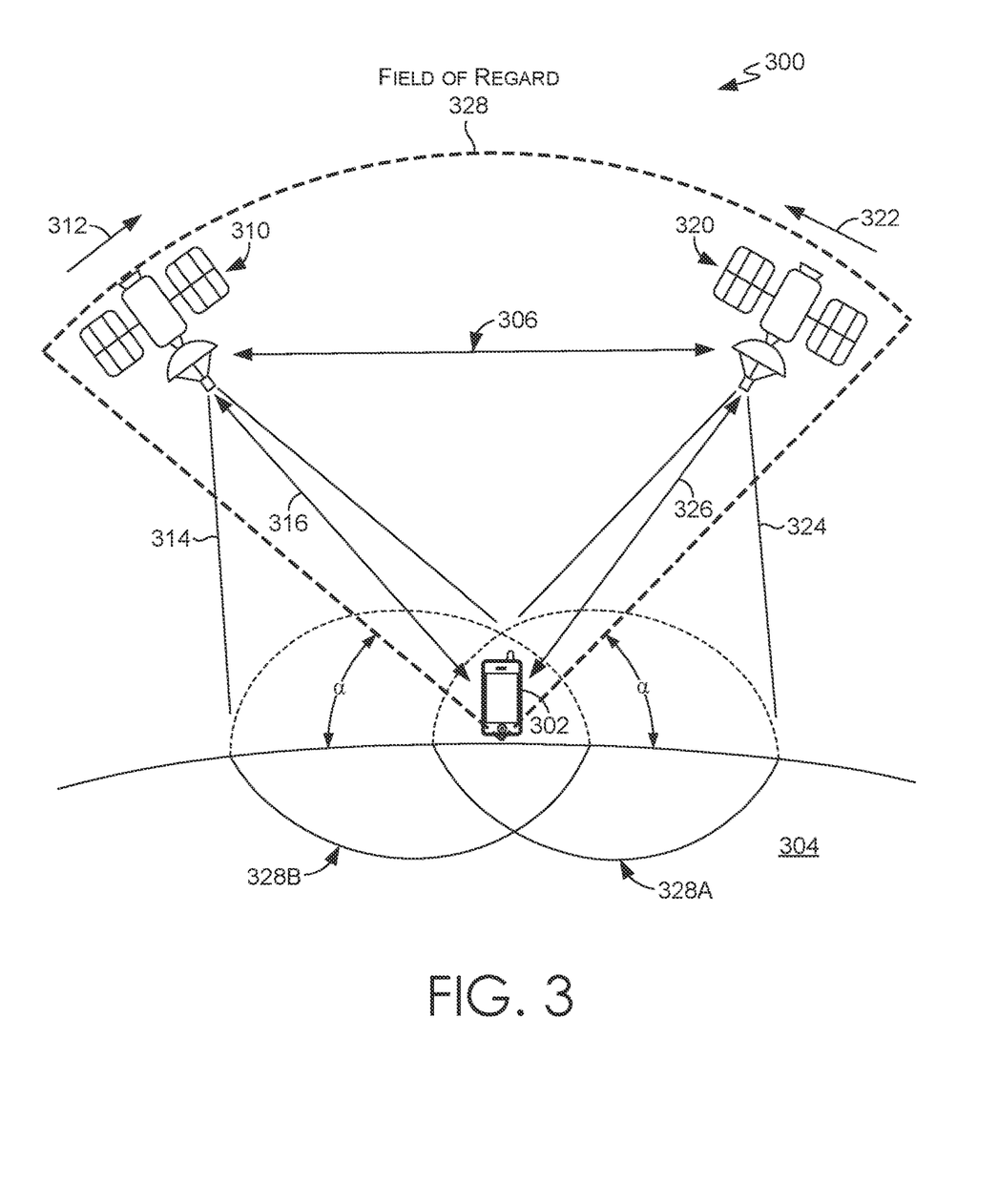
FIG. 3 depicts a diagram of dynamic power control of a LEO satellite, in which implementations of the present disclosure may be employed, in accordance with aspects herein.

FIG. 3 depicts a diagram of dynamic power control of a LEO satellite, in which implementations of the present disclosure may be employed, in accordance with aspects herein. At a high level the network environment 300 comprises a UE 302 that is at an altitude on or above the earth 304. The UE 302 may be located in an airplane and may be at a higher altitude. FIG. 3 also includes one or more extraterrestrial base stations, represented in FIG. 3 as a first extraterrestrial base station 310 and a second extraterrestrial base station 320. The altitude of UE 302 may vary and the UE 302 may encounter weather conditions that may attenuate a signal received from either first extraterrestrial base station 310 or second extraterrestrial base station 320. An airborne UE 302 may be above weather conditions with respect to the first extraterrestrial base station 310 and the second extraterrestrial base station 320. The UE 302 may communicate through either first extraterrestrial base station 310 or second extraterrestrial base station 320. Though each of the first extraterrestrial base station 310 and the second extraterrestrial base station 320 are illustrated as being satellites, it should be understood that the present disclosure is not limited to space-based implementations; either or both of the first extraterrestrial base station 310 and the second extraterrestrial base station 320 may be in the form of an aircraft or any other non-terrestrial base station. Similarly, though the UE 302 is illustrated as a cellular phone, the UE 302 may be any computing device described with respect to FIG. 1.

Each of the first extraterrestrial base station 310 and the second extraterrestrial base station 320 are configured to wirelessly communicate with the UE 302. In aspects, each of the extraterrestrial base stations may communicate with the UE using any wireless telecommunication protocol desired by a network operator, including but not limited to 3G, 4G, 5G, 6G, 802.11x and the like. Each of the first extraterrestrial base station 310 and the second extraterrestrial base station 320 may establish a wireless connection with the UE 302; the first extraterrestrial base station 310 may communicate with the UE 202 using a first direct connection link 306 and the second extraterrestrial base station 320 may communicate with the UE 302 using a second direct connection link 316. Though illustrated as a two-way communication link, either or both of the first direct connection link 306 and the second direct connection link 316 may be one-way (i.e., downlink only) instead of bi-directional (i.e., downlink and uplink). Each of the first extraterrestrial base station 310 and the extraterrestrial base station may be said to provide telecommunication coverage to a geographic area; as illustrated in FIG. 3, the first extraterrestrial base station 310 may be said to serve a first geographic coverage area 314 and the second extraterrestrial base station 320 may be said to serve a second geographic coverage area 324. Further, FIG. 3 illustrates that each of the first extraterrestrial base station 310 and the second extraterrestrial base station 320 are in motion relative to the UE 302; that is, the first extraterrestrial base station 310 may be said to moving along a first track 312 and the second extraterrestrial base station 320 may be said to be moving along a second track 322. Despite the illustrated embodiment, in some aspects of the present disclosure, either or both of the first extraterrestrial base station 310 and the second extraterrestrial base station 320 may be stationary with respect to a point on the earth 304 (i.e., the extraterrestrial base station may be in a GEO orbit). In addition to the connection between the extraterrestrial base stations and the UE 302, in some aspects of the present disclosure, the first extraterrestrial base station 310 may be communicatively coupled, via a first direct connection link 306, to the second extraterrestrial base station 320; in other aspects, the first extraterrestrial base station 310 may be communicatively coupled to the second extraterrestrial base station 320 via one or more ground stations (not illustrated so as not to obscure other portions of the invention).

FIG. 3 also depicts the field of regard 328 A of first extraterrestrial base station 310 and the field of regard 328 B of second extraterrestrial base station 320. The field of regard is the total area that can be captured by a moving extraterrestrial base station and is the angular cone perceivable by the extraterrestrial base station at a particular instant of time. A UE 302 can communicate with first extraterrestrial base station 310 when transmitting and/or receiving within the field of regard. As UE 302 moves toward the boundary of the field of regard 328 A the UE may be handed off to second extraterrestrial base station 320.

In extraterrestrial communication systems two types of power calculations may be performed, transmitting power calculations and receiving power calculations. The power calculations may be included in a link budget, which is an accounting of all of the power gains and losses experienced by a telecommunication system. A UE 302 may need the first extraterrestrial base station 310 to transmit at a higher power level for a number of reasons that may include: an elevation of the UE 302, weather between UE 302 and first extraterrestrial base station 310, UE 302 moving at a high rate of speed, and whether the UE 302 is at a margin of the coverage area of first extraterrestrial base station 310.

The elevation of UE 302 may increase or decrease the amount of transmit power needed for communications through first extraterrestrial base station 310. If the UE 302 is in an aircraft it may be at a higher elevation and may need less power to communicate through first extraterrestrial base station 310. If the weather conditions are clear there is less attenuation over the communication path between the UE 302 and second extraterrestrial base station 320. Weather may attenuate signals between UE 302 and second extraterrestrial base station 320 and more power may be needed to successfully communicate with UE 302. The transmit power of first extraterrestrial base station 310 and second extraterrestrial base station 320 may be adjusted based on an altitude of the UE 302 and weather conditions between the UE 302 and the first or second extraterrestrial base stations 310 and 320. Weather may be accounted for by incorporating a weighing factor when call setup or other communications degrade over the first direct connection link 306 and the second direct connection link 316. The degradation may result in packet loss and an increase in retransmission requests.

Weather is not the only cause of attenuation. A UE 302 in FIG. 3 also communicates with a first extraterrestrial base station 310 and transmits a signal at an angle α to the earth 304. If α is 30°, then the link budget may have a margin of +3 dB. This example assumes that the frequency in use is 600 MHz and uses QPSK modulation at a data rate of 10 kbps. Continuing with the example, the UE 302 may use an uplink transmit power of 1.0 watt and have an antenna gain of 0 dB. The downlink power used by the first extraterrestrial base station 310 to transmit to UE 302 may be part of a link budget of +4.3 dB. In contrast, when the first extraterrestrial base station 310 is at an α of 90° the uplink link budget is 8.4 dB and the downlink link budget is 9.8 dB. With larger margins and a direct line of sight to the UE, downlink power needs may be reduced.

The link budget determines how many UEs may be served by a particular extraterrestrial base station. A UE, such as UE 302 that is at a higher altitude may be served by a lower downlink power setting from the first extraterrestrial base station 310. A UE in an airplane may be served by an even lower downlink power settings. Using the minimum amount of downlink transmit power allows an extraterrestrial base station to serve additional UEs. As a UE moves through the field of regard of the extraterrestrial base station a higher downlink power may be necessary for an extraterrestrial base station to provide service. At some point, a UE that is at a lower altitude as well as a UE that is at a margin of the field of regard may need to be transferred to a different extraterrestrial base station, such as second extraterrestrial base station 320 for service.

In some cases, the downlink transmit power needed to serve a particular UE may be such that no downlink power is available for other UEs. Margin in the link budget may be considered, as well as the altitude and weather the UE is encountering may all affect the downlink power needed to communicate with a particular UE. If it is necessary to transfer a UE from first extraterrestrial base station 310 to second extraterrestrial base station 320 then a transfer signal may be sent over first direct connection link 306 may be sent between the first and second extraterrestrial base stations 310 and 320 to affect the transfer.

In determining an amount of downlink transmit power needed to serve a UE, the extraterrestrial base station may consider the link budget available, the link budget margin at the a of the UE, weather in the area of the UE, altitude of the UE, and a rate of movement or speed of the UE. These factors may be considered by assigning weighing factors, signal attenuation, and other factors, such as limitations of the UE itself.

Figure 4:
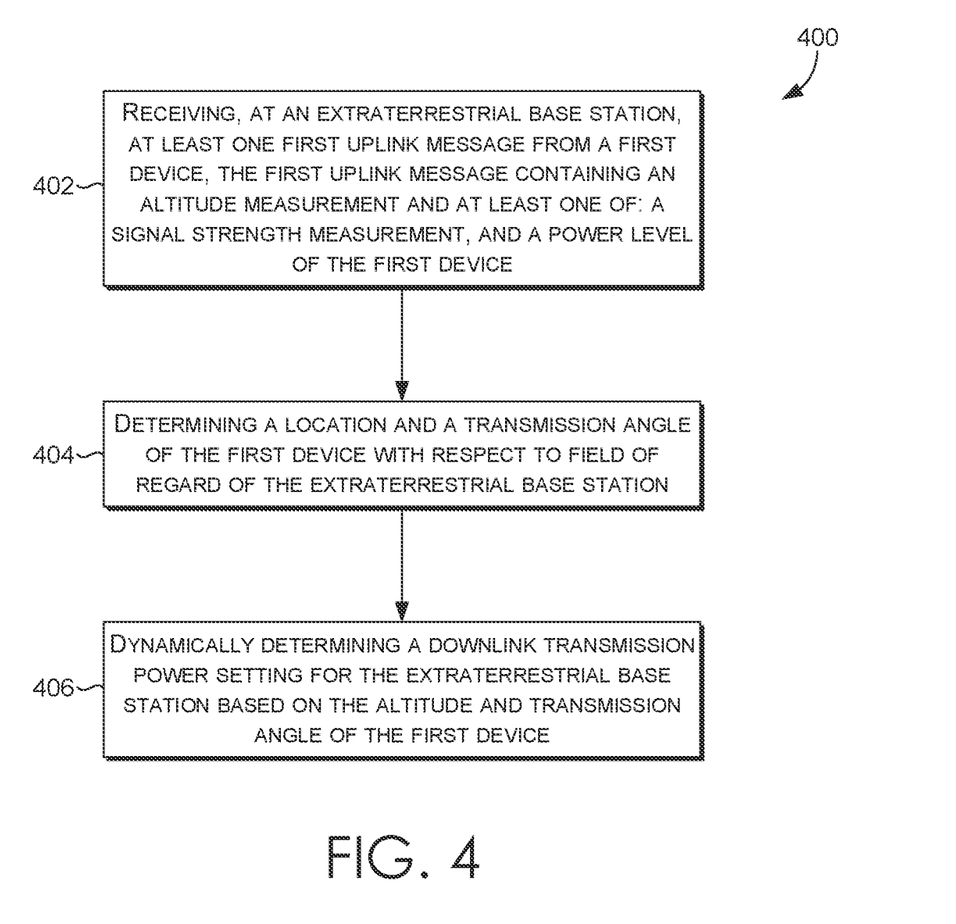
FIG. 4 is a flow diagram of dynamic power control of a LEO satellite in an exemplary network environment, in which aspects of the present disclosure may be employed, in accordance with aspects herein.

FIG. 4 is a flow diagram of dynamic power control of a LEO satellite in an exemplary network environment, in which aspects of the present disclosure may be employed, in accordance with aspects herein. The method 400, begins in step 402 with receiving, at an extraterrestrial base station, at least one first uplink communication from a first device, the first uplink communication containing an altitude measurement of the first device and at least one of a signal strength measurement and a power level of the first device. The signal strength and power level of the first device may be used in determining if the first device can be served by the extraterrestrial base station and the current power setting under the current conditions. If the extraterrestrial base station does not have sufficient power available to serve the first device it may request that the first device increase transmission power. This type of trade-off uses the power level and signal strength of the devices communicating through the extraterrestrial base station to efficiently and effectively serve the greatest number of devices. The method then continues in step 404 with determining a location and a transmission angle of the first device with respect to a field of regard of the extraterrestrial base station. Then, in step 406, the method concludes with dynamically determining a downlink transmission power setting for the extraterrestrial base station based on the altitude measurement and the transmission angle of the first device.

The uplink communication may also include an estimate of an amount of attenuation that may be present in the first uplink communication. The attenuation may be affected by weather conditions where the device is operating with severe weather conditions, such as thunderstorms, able to significantly attenuate signals.

Downlink transmission power may need to be increased when an altitude measurement is less than a predetermined threshold. The predetermined threshold may be based on an altitude above sea level where the device is operating. Mountainous regions provide greater elevation and less downlink transmit power may be used for satellite communications. Conversely, some locations may be at or below sea level, and thus may require additional downlink transmission power.

Transmission angle and location within the satellite's field of regard may also affect downlink transmission power settings. A device communicating with an extraterrestrial base station directly overhead, at 90° may need less downlink transmission power than a device communicating at a transmission angle of 30°. The amount of downlink transmission power available may be limited by the need for the extraterrestrial base station to serve additional devices. When an extraterrestrial base station cannot serve a device because the combination of transmit angle and location within the field of regard would require all or nearly all of the available downlink transmission power, the device may be transferred to another extraterrestrial base station that has sufficient downlink transmit power available.

FIG. 5 depicts an exemplary computing device suitable for use in implementations of the present disclosure, in accordance with aspects herein. With continued reference to FIG. 5, computing device 500 includes bus 502 that directly or indirectly couples the following devices: memory 504, one or more processors 506, one or more presentation components 508, input/output (I/O) ports 512, I/O components 510, radio 516, transmitter 518, and power supply 514. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 510. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 510. One or more presentation components 508 present data indications to a person or other device. Exemplary one or more presentation components 508 include a display device, speaker, printing component, vibrating component, etc. I/O ports 512 allow computing device 500 to be logically coupled to other devices including I/O components 510, some of which may be built into computing device 500. Illustrative I/O components 510 include a microphone, joystick, game pad, satellite dish, scanner, printer, wireless device, etc.

The radio 516 represents one or more radios that facilitate communication with a wireless telecommunications network. While a single radio 516 is shown in FIG. 5, it is contemplated that there may be more than one radio 516 coupled to the bus 502. In aspects, the radio 516 utilizes a transmitter 518 to communicate with the wireless telecommunications network. It is expressly conceived that a computing device with more than one radio 516 could facilitate communication with the wireless telecommunications network via both the first transmitter 518 and an additional transmitters (e.g. a second transmitter). Illustrative wireless telecommunications technologies include CDMA, GPRS, TDMA, GSM, and the like. The radio 516 may additionally or alternatively facilitate other types of wireless communications including Wi-Fi, WiMAX, LTE, 3G, 4G, LTE, 5G, 6G, NR, VOLTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even base stations (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of dynamic power configuration of low earth orbit satellites in a network, the method comprising:
receiving at an extraterrestrial base station, at least one first uplink communication from a first device, the first uplink communication containing an altitude measurement of the first device and at least one of: a signal strength measurement and a power level of the first device;
determining a location and a transmission angle of the first device with respect to a field of regard of the extraterrestrial base station; and
dynamically determining a downlink transmission power setting for the extraterrestrial base station based on the altitude measurement and the transmission angle of the first device.

2. The method of claim 1, further comprising estimating an amount of attenuation in the at least one first uplink communication from the first device.

3. The method of claim 2, wherein the amount of attenuation in the at least one first uplink communication from the first device is weather-related.

4. The method of claim 1, wherein the downlink transmission power setting for the extraterrestrial base station is increased when the altitude measurement is less than a predetermined threshold.

5. The method of claim 1, wherein the downlink transmission power setting for the extraterrestrial base station is decreased when the altitude measurement exceeds a predetermined threshold.

6. The method of claim 4, wherein the downlink transmission power setting for the extraterrestrial base station is increased when the transmission angle is below a predetermined threshold.

7. The method of claim 5, wherein the downlink transmission power setting for the extraterrestrial base station is decreased when the transmission angle exceeds a predetermined threshold.

8. The method of claim 1, further comprising comparing the downlink transmit power level of the extraterrestrial base station with a current transmit power allocation serving at least one other device.

9. The method of claim 8, further comprising transferring at least one device to a second extraterrestrial base station when a combination of the current transmit power allocation and the downlink transmit power level exceed a transmission power limit of the extraterrestrial base station.

10. A method of dynamic power configuration of low earth orbit satellites in a network comprising:
transmitting, from a first device, at least one first uplink communication, the first uplink communication containing an altitude measurement and at least one of: a signal strength measurement and a power level of the first device; and
dynamically adjusting an uplink transmission power setting for the device in response to receiving a downlink communication, the downlink communication based on the altitude measurement and the transmission angle of the first device.

11. The method of claim 1, wherein the first uplink communication contains an estimate of signal attenuation based on weather at a location of the first device.

12. The method of claim 1, wherein the first uplink communication contains information that the first device is airborne.

13. The method of claim 12, wherein the first uplink communication contains information of an altitude and velocity of an airborne first device.

14. A non-transitory computer storage media storing computer-useable instructions that, when used by one or more processors, cause the processors to:
receive, at an extraterrestrial base station, at least one first uplink communication from a first device, the first uplink communication containing an altitude measurement of the first device and at least one of: a signal strength measurement and a power level of the first device;

determine a location and a transmission angle of the first device with respect to a field of regard of the extraterrestrial base station; and dynamically determine a downlink transmission power setting for the extraterrestrial base station based on the altitude measurement and the transmission angle of the first device.

15. The non-transitory computer storage media of claim 14, further comprising estimate an amount of attenuation in the at least one first uplink communication from the first device.

16. The non-transitory computer storage media of claim 15, wherein the amount of attenuation in the at least one first uplink communication from the first device is weather-related.

17. The non-transitory computer storage media of claim 15, wherein the downlink transmission power setting for the extraterrestrial base station is increased when the altitude measurement is less than a predetermined threshold.

18. The non-transitory computer storage media of claim 15, wherein the downlink transmission power setting for the extraterrestrial base station is decreased when the altitude measurement exceeds a predetermined threshold.

19. The non-transitory computer storage media of claim 17, wherein the downlink transmission power setting for the extraterrestrial base station is increased when the transmission angle is below a predetermined threshold.

20. The non-transitory computer storage media of claim 18, wherein the downlink transmission power setting for the extraterrestrial base station is decreased when the transmission angle exceeds a predetermined threshold.

* * * * *

UNITED STATES PATENT AND TRADEMARK OFFICE
CERTIFICATE OF CORRECTION

PATENT NO. : 12,348,301 B2
APPLICATION NO. : 18/078860
DATED : July 1, 2025
INVENTOR(S) : Bharath Reddy Medarametla Lakshmi Page 1 of 1

It is certified that error appears in the above-identified patent and that said Letters Patent is hereby corrected as shown below:

On the Title Page

Item (73), IN THE ASSIGNEE:
Column no. 1, Line no. 1, replace "T-Moble Innovations" with --T-Mobile Innovations--.

Signed and Sealed this
Nineteenth Day of August, 2025

Coke Morgan Stewart
*Acting Director of the United States Patent and Trademark Office*